(12) United States Patent
Kremen (10) Patent No.: US 7,489,332 B2
(45) Date of Patent: *Feb. 10, 2009

(54) SYSTEM AND METHOD FOR PRODUCING A UNIFORMLY MAGNIFIED THREE-DIMENSIONAL IMAGE OF A THREE-DIMENSIONAL SCENE

(76) Inventor: Stanley H. Kremen, 4 Lenape La., East Brunswick, NJ (US) 08816

( * ) Notice: Subject to any disclaimer, the term of this patent is extended or adjusted under 35 U.S.C. 154(b) by 31 days.

This patent is subject to a terminal disclaimer.

(21) Appl. No.: 10/904,888

(22) Filed: Dec. 2, 2004

(65) Prior Publication Data

US 2005/0068415 A1  Mar. 31, 2005

Related U.S. Application Data

(63) Continuation-in-part of application No. 10/292,137, filed on Nov. 12, 2002, which is a continuation of application No. 09/749,984, filed on Dec. 27, 2000, now Pat. No. 6,593,958, which is a continuation of application No. 09/111,990, filed on Jul. 8, 1998, now Pat. No. 6,229,562.

(60) Provisional application No. 60/051,972, filed on Jul. 8, 1997.

(51) Int. Cl.
*H04N 13/04* (2006.01)
*G02B 27/10* (2006.01)

(52) U.S. Cl. ........................................ 348/51; 359/619

(58) Field of Classification Search .................. 348/51, 348/52, 40, 54, 42; 359/202, 458, 619; 382/131
See application file for complete search history.

(56) References Cited

U.S. PATENT DOCUMENTS

| 5,040,871 | A  | * | 8/1991  | Davies et al. | 359/458 |
| 5,694,235 | A  | * | 12/1997 | Kajiki        | 359/202 |
| 6,061,083 | A  | * | 5/2000  | Aritake et al.| 348/51  |
| 6,438,260 | B1 | * | 8/2002  | Robinson      | 382/131 |
| 7,002,749 | B2 | * | 2/2006  | Kremen        | 359/619 |

* cited by examiner

*Primary Examiner*—Gims Philippe (57) ABSTRACT

A system and method that produces a uniformly magnified three-dimensional image of a three-dimensional scene. The system and method use integral photography along with a scaling-up process for magnification. In one embodiment, an integral photograph representative of a three-dimensional scene is created using an input imaging array. The integral photograph is enlarged by a magnification factor. A uniformly magnified three-dimensional image is reconstructed using an output imaging array that has been scaled-up from the first input array by the magnification factor according to the scaling-up process. In a second embodiment, no input array is used. Instead, a prepared integral frame representative of the three-dimensional scene is presented for magnification. In an embodiment, the integral frame is drawn, printed, or electronically prepared by geometric projection with the same properties as though a magnified three-dimensional scene were to be presented to a virtual imaging array (i.e., using ray tracing). This embodiment may be used to produce a magnified three-dimensional cartoon. Use of the scaling-up process permits the use of generalized imaging arrays composed of generalized imaging elements, where adjacent imaging elements may or may not touch each other.

37 Claims, 9 Drawing Sheets

FIG. 8

SYSTEM AND METHOD FOR PRODUCING A UNIFORMLY MAGNIFIED THREE-DIMENSIONAL IMAGE OF A THREE-DIMENSIONAL SCENE

CROSS REFERENCE TO RELATED APPLICATIONS

This U.S. Non-Provisional patent application is a continuation-in-part of and claims the benefit of pending U.S. Non-Provisional application Ser. No. 10/292,137 (published as US 2003-0160864 A1) filed on Nov. 12, 2002, entitled SYSTEM AND APPARATUS FOR RECORDING AND PROJECTING 3-DIMENSIONAL IMAGES (hereinafter the 137-Application); which in-turn is a continuation of and claims the benefit of U.S. Non-Provisional application Ser. No. 09/749,984 filed on Dec. 27, 2000 (having matured into U.S. Pat. No. 6,593,958 issued on Jul. 15, 2003—hereinafter the 958-Patent) entitled SYSTEM, APPARATUS AND METHOD FOR THE RECORDING AND PROJECTION OF IMAGES IN SUBSTANTIALLY 3-DIMENSIONAL FORMAT (hereinafter the 984-Application); which in-turn is a continuation of and claims the benefit of U.S. Non-Provisional application Ser. No. 09/111,990 (hereinafter the 990-Application) filed on Jul. 8, 1998 (having matured into U.S. Pat. No. 6,229,562 issued on May 8, 2001—hereinafter the 562-Patent) entitled SYSTEM, APPARATUS AND METHOD FOR THE RECORDING AND PROJECTION OF IMAGES IN SUBSTANTIALLY 3-DIMENSIONAL FORMAT; which in-turn claims the benefit of U.S. Provisional Application No. 60/051,972 filed on Jul. 8, 1997 (hereinafter the Provisional application). All of said patent applications and patents are incorporated in their entirety herein by reference thereto. Applicant hereby claims the benefit of the earliest priority date of Jul. 8, 1997 for the cited US applications and patents. Collectively, all of said patents and applications that form the basis for the Present Invention and are incorporated herein by reference are hereinafter referred to as the Claimed Priority Patents and Applications.

BACKGROUND

The Claimed Priority Patents and Applications disclosed a system, apparatus, and method to produce a uniformly magnified three-dimensional image of a three-dimensional scene in such manner as to preserve the depth to height and width relationship of the image as it existed prior to magnification. This method requires the three-dimensional image prior to magnification to be rendered as an array of two-dimensional images by some form of matrix lens array, such as a fly's eye lens. This array of two-dimensional images is called an integral frame. Were this integral frame to be magnified by some magnification factor, and then viewed or projected through a new matrix lens array that has been scaled up from the lens array that produced the original array of two-dimensional images, such that the scaling factor is equal to the magnification (i.e., the focal length and diameter of each lenslet must be multiplied by the same magnification factor), a new three-dimensional image would be produced that would be magnified by the same magnification factor, and all image dimensions would be magnified by the same factor such that all dimensions of the final three-dimensional image would be proportional to the dimensions of the original image. The utility of magnifying three-dimensional images using this method would be the ability to enlarge holograms or integral photographs or other media from which three-dimensional images are produced, or to project still or moving three-dimensional images before a large audience.

Figure 1:
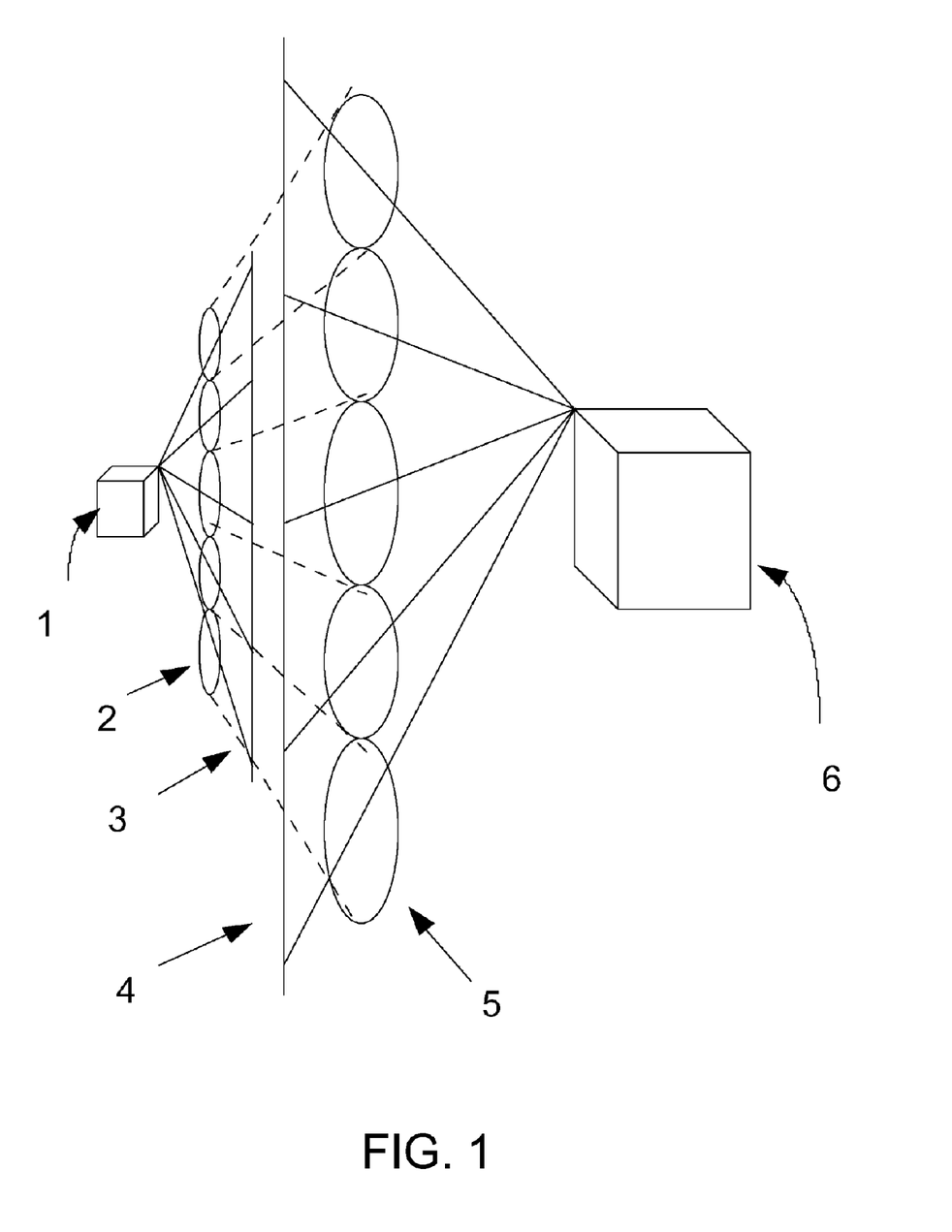
FIG. 1 is an illustration of the Principle of Magnification and Projection from the Claimed Priority Patents and Applications.

The magnification principle is illustrated in FIG. 1. Object 1 is photographed by matrix lens array 2, thereby producing integral photograph 3. Integral photograph 3 is then magnified to give integral photograph 4 which is then placed behind matrix lens array 5. This combination yields magnified image 6.

It must be noted here, that during scaling-up, the (F/#) of the lenslets remains constant. In this case, the equation for (F/#) is:

$$(F/\#) = f/d$$

where
  f=the focal length of a lenslet; and
  d=the diameter of a lenslet.

Examples of several different traditional matrix lens arrays are disclosed, and in all cases the focal lengths and diameters of the lenslets are scaled-up uniformly by the magnification factor. In one embodiment, an array of cylindrical lenslets is used. This type of array is known as a lenticular sheet or a Bonnet screen. In this case, the lenslet diameter is a meaningless term. Instead, the focal lengths and horizontal widths of the lenslets are scaled-up uniformly.

All of the examples of matrix lens arrays disclosed in the Claimed Priority Patents and Applications are configured such that adjacent lenslets touch each other. If the lenslets do not touch, maintaining the (F/#) constant during the scaling-up process will not work. In this case, the equation for (F/#) is the same as above, where d is known as the aperture.

It would be desirable to have a system and method for uniformly magnifying three-dimensional images where any imaging array could be used. In the general case, imaging elements substitute for lenslets, although imaging elements may comprise lenslets. They could be holographic optical elements or they could even be pinholes. Adjacent imaging elements may or may not touch each other. Such an imaging array should be able to be comprised of different types of elements within the same array. The imaging arrays could have a matrix arrangement of imaging elements, a linear arrangement of imaging elements, or any other arrangement of imaging elements. They should be able to have local arrangements of imaging elements that are different from other local arrangements on the same array. The arrays need not be planar. The original imaging array that captures an image of the three-dimensional scene need not necessarily have the same types of imaging elements as the array that reconstructs the magnified three-dimensional image. The only requirement is that the imaging arrays have a fixed geometric relationship to each other. Similarly, they must also have a fixed geometric relationship to the integral frames upon which they operate. Finally, one should be able to draw or print the elemental images of the integral frame without the requirement of a first imaging array to capture an image of the three-dimensional scene. For example, this technique would be used to produce three-dimensional cartoons.

SUMMARY OF THE INVENTION

The Present Invention is a system and method for producing a uniformly magnified three-dimensional image of a three-dimensional scene. The system and method employ the principles of integral photography along with a scaling-up process for magnification. In one embodiment of each, the system or method creates an integral frame representative of a three-dimensional scene using an input imaging array, enlarges the integral frame by a magnification factor, and reconstructs a uniformly magnified three-dimensional image using an output imaging array that has been scaled-up from the first input array by the magnification factor according to the scaling-up process. In a second embodiment, no input array is used. Instead, a prepared integral frame representative of the three-dimensional scene is presented for magnification. In an embodiment of the method, the integral frame is drawn, printed, or electronically prepared by geometric projection with the same properties as though a magnified three-dimensional scene were to be presented to a virtual imaging array (i.e., using ray tracing). This embodiment may be used to produce a magnified three-dimensional cartoon. Using the scaling-up process, that is the subject of the Present Invention, permits the use of generalized imaging arrays composed of generalized imaging elements, where adjacent imaging elements may or may not touch each other.

BRIEF DESCRIPTION OF DRAWINGS

FIG. 3(a) shows spherical elements positioned in a square matrix.

FIG. 3(b) shows spherical elements that are hexagonally close packed.

FIG. 3(c) shows rectangular elements positioned in a rectangular matrix.

FIG. 3(d) shows linearly adjacent cylindrical elements.

FIG. 3(e) shows hexagonally shaped spherical elements that are hexagonally close packed.

FIG. 3(f) shows a hexagonally close packed array of pinholes on a dark substrate.

FIG. 4(a) is a top plan view and FIG. 4(b) is a front elevational view.

DEFINITION OF TERMS USED IN THE PRESENT APPLICATION

Within the Present Application, the Applicant intends to use his own definitions of many special terms. Insofar as these special terms are used herein, the definitions provided below supersede the plain and ordinary meanings of the words. The definitions follow:

ANALOG PROJECTION—simultaneous projection of all of the radiation (or rays) of an image from one location to another.

DIGITAL PROJECTION—projection of radiation (or rays) from a discrete location of an image to another discrete location.

ELEMENTAL IMAGE—a single two-dimensional image of a scene as observed from a single viewpoint and which plainly shows that scene.

EVERSION or EVERTING (or TO EVERT)—a process that transforms a pseudoscopic three-dimensional image into an orthoscopic three-dimensional image.

FIXED ALIGNMENT—Two objects (be they images or imaging arrays) are in fixed alignment with each other if the point-to-point relationship between them does not change.

FOCAL CHARACTERISTIC—an array of focal lengths for all of the imaging elements of a matrix lens array.

GEOMETRICALLY SIMILAR IN ARRANGEMENT—two arrays of imaging elements or of elemental images are similar if the ratio of separation characteristics of both arrays is a constant.

IMAGE CHARACTERISTIC—a function which when applied to the elemental images of an integral frame yields the focal characteristic of the matrix lens array that produced or would have produced the integral frame.

IMAGING ARRAY—an arrangement of a coordinated collection of imaging elements each capable of producing an in-focus elemental image from electromagnetic radiation (preferably light rays), thereby forming an integral frame. This term is synonymous with MATRIX LENS ARRAY.

IMAGING ELEMENT—that part of a matrix lens array which is capable of producing a single in-focus elemental image of an integral frame from electromagnetic radiation (preferably light rays).

INTEGRAL FRAME—a two-dimensional arrangement of a coordinated collection of elemental images from a single scene.

INTEGRAL PHOTOGRAPH—a two-dimensional photograph or drawing of an INTEGRAL FRAME.

MAGNIFICATION FACTOR—the ratio of essential dimensions of that which is magnified or enlarged to those of that which is unmagnified or not enlarged.

MATRIX LENS ARRAY—This term is synonymous with IMAGING ARRAY.

PROJECTING (PROJECTION)—causing electromagnetic radiation (or light rays) to travel from one location to another.

PROJECTION BY SCANNING—forming an image on a surface whereby a discrete light or electromagnetic beam controllably travels to various points on the surface while varying in intensity.

PROJECTION IS ACCOMPLISHED ELECTROMAGNETICALLY—projection wherein electromagnetic radiation (other than light) is transmitted from one location to another using electronic devices.

PROJECTION IS ACCOMPLISHED OPTICALLY—projection wherein light rays travel through optical elements from one location to another.

SCENE—an object or collection of objects positioned in space. A scene is two-dimensional if all object points lie in a single plane that is perpendicular to the line of sight. Otherwise, it is three-dimensional.

SEPARATION CHARACTERISTIC—a array of separation distances for all of the elemental images of an integral frame or a matrix lens array.

SEPARATION DISTANCE—The distance between the centers of two elemental images of an integral frame.

UNIFORM ENLARGEMENT—(for a two-dimensional image) is essentially equal magnification in all planar (or surface) dimensions.

UNIFORM MAGNIFICATION—(for a three-dimensional image) is essentially equal magnification in all spatial dimensions.

DESCRIPTION OF THE PREFERRED AND ALTERNATE EMBODIMENTS

Once again, FIG. 1 shows an optical ray trace that shows how a scaling-up process may produce uniformly magnified three-dimensional image 6 from three-dimensional object or scene 1. Integral frame 3 is created using imaging array 2. Integral frame 3 is then enlarged uniformly by a magnification factor to create integral frame 4. Image 6 is reconstructed using imaging array 5 which has been scaled-up from imaging array 2 by the magnification factor. The Claimed Priority Patents and Applications disclose a scaling-up process whereby the focal length and diameter of each imaging element of a first array is multiplied by the magnification factor to produce or select each corresponding lenslet focal length and diameter of a second array such that the (F/#) of the corresponding lenslets of both arrays remains the same. It should be noted that the uniform enlargement of the integral frame may be by analog or digital projection. Enlargement projection may be accomplished optically, electromagnetically, or by scanning.

Figure 2:
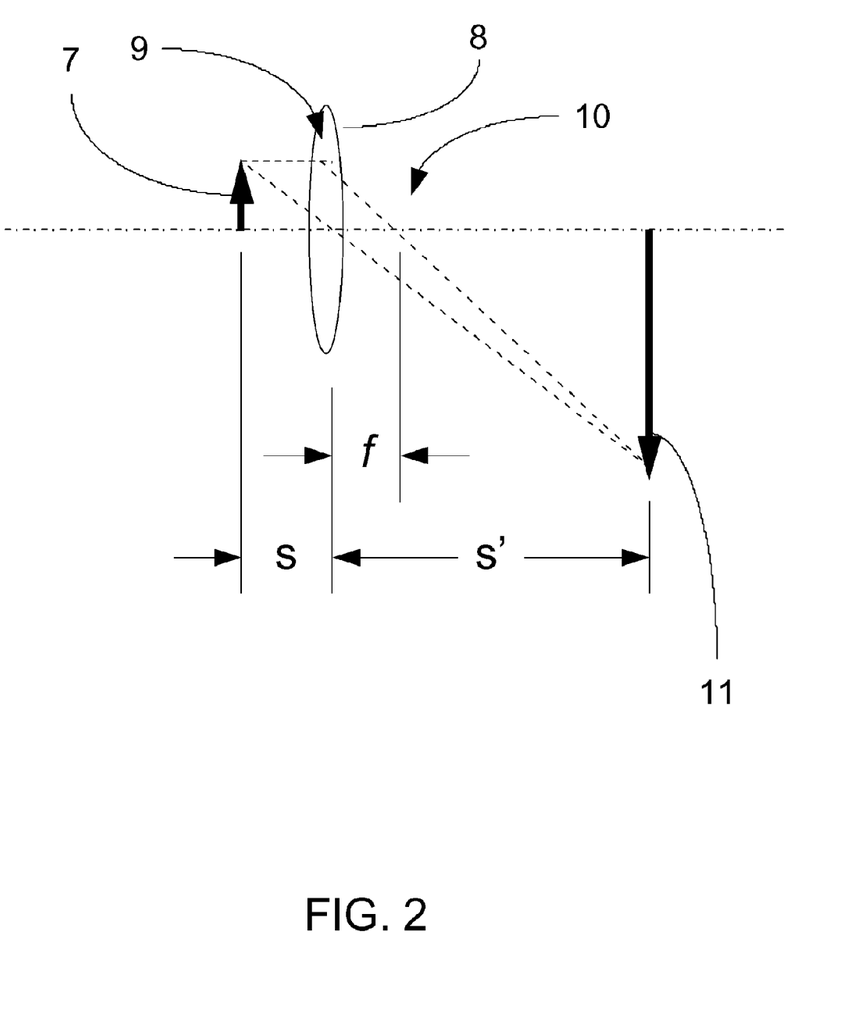
FIG. 2 is an illustration showing how an object point is focused onto an image plane using a thin lens.

Examination of the optical ray trace of FIG. 1 shows rays from a point on object or scene 1 passing through the center of each lenslet of array 2 thereby producing integral frame 3 which lies in the image plane of array 2. Similarly, rays from the respective representations of the same point on integral frame 4, which lies in the image plane of array 5, pass through the center of the lenslets of array 5 to form the magnified image 6. FIG. 2 shows how a thin lens (or individual lenslet, in this case) forms an image. For magnification, arrow 7 is imaged through lens 8 to form magnified image 11 on the image plane of lens 8. To calculate where a point on an object plane is imaged on the image plane, one need merely trace the intersection of two rays. For a thin lens, a ray of light from a point on object 7 passing through lens 8 perpendicular to the central plane 9 of the lens will pass through the focal point 10 to a corresponding point on image 11 in the image plane of the lens. Also, a ray of light from the same point on object 7 that passes through the exact center of lens 8 will intersect the image plane at the same point. The point on image 11 corresponding to the same point on object 7 is computed as the intersection of these two rays. The focal point 10 lies on an axis perpendicular to the central plane of lens 8 and passing through the exact center of the lens. The distance from the center of the lens to the focal point is f. The distance of the object to the central plane of the lens is s, while the distance from the central plane of the lens to the image plane is s'. This is the imaging distance. The magnification factor M is computed as the ratio of s': s. Note that image 11 is upside-down when compared to object 7. The lens reverses the image uniformly in all dimensions. Clearly, demagnification (as is the case where integral frame 3 is created—see FIG. 1) represents the inverse of the magnification process, but the ray trace is the same. The smaller the diameter of the lenslets of imaging array 2, the greater the depth of field. Were the diameter to become extremely small so that the lenslet becomes a pinhole, the depth of field would be infinite. The lenslets of array 2 are indeed very small. Therefore, an image plane can be chosen where most objects of interest from the three-dimensional scene would be in focus. Consequently, the ray trace shown in FIG. 1 only showing a ray passing through the center of each lenslet is valid to demonstrate the scaling-up process.

The scaling-up process of the Present Invention is different. Were adjacent lenslets in array 2 not to touch each other, or were an array of irises to be introduced to limit the apertures of the lenslets, the scaling-up process that calculates the focal lengths and apertures of the lenslets of array 3 might not work in all cases where the (F/#) remains the same. For the scaling-up process of the Present Invention to work in the general case, not only must the focal lengths of the lenslets of array 2 be multiplied by the magnification factor to yield the corresponding focal lengths of the lenslets of array 5, but so also must the distances between the centers of the imaging elements of array 2 be multiplied by the same magnification factor to yield the corresponding center distances for array 5.

The imaging elements need not all have the same focal length (as might be the case for a non-planar array) and they need not have the same center distance arrangement over the entire area of the imaging array. Therefore, I introduce here the concept of the focal characteristic of an imaging array and the separation characteristic of an imaging array, both having been previously defined. In the scaling-up process of the Present Invention, both the focal characteristic and separation characteristic of the first imaging array must be multiplied by the magnification factor to obtain the focal characteristic and separation characteristic of the second imaging array. However, the ratio of focal characteristic to separation characteristic for both arrays must remain the same. Furthermore, the two imaging arrays must be geometrically similar.

Likewise, an integral frame has a separation characteristic and an image characteristic (previously defined). The image characteristic is a unique function of the focal characteristic of the imaging array that made or would have made the integral frame. Even a drawn or printed integral frame has an image characteristic. In the scaling-up process of the Present Invention, the first integral frame is uniformly enlarged by the magnification factor to form a second integral frame. The separation characteristic and image characteristic of the first integral frame is determined, respectively, by the separation characteristic and focal characteristic of the first imaging array. The separation characteristic and image characteristic of the second integral frame is determined, respectively, by the separation characteristic and focal characteristic of the second imaging array. In other words, the second integral frame is identical to one that would have been produced by the second imaging array. By scaling up both the integral frames and the imaging arrays, the three-dimensional image reconstructed from the second integral frame and imaging array will be uniformly magnified by the magnification factor.

Figure 3:
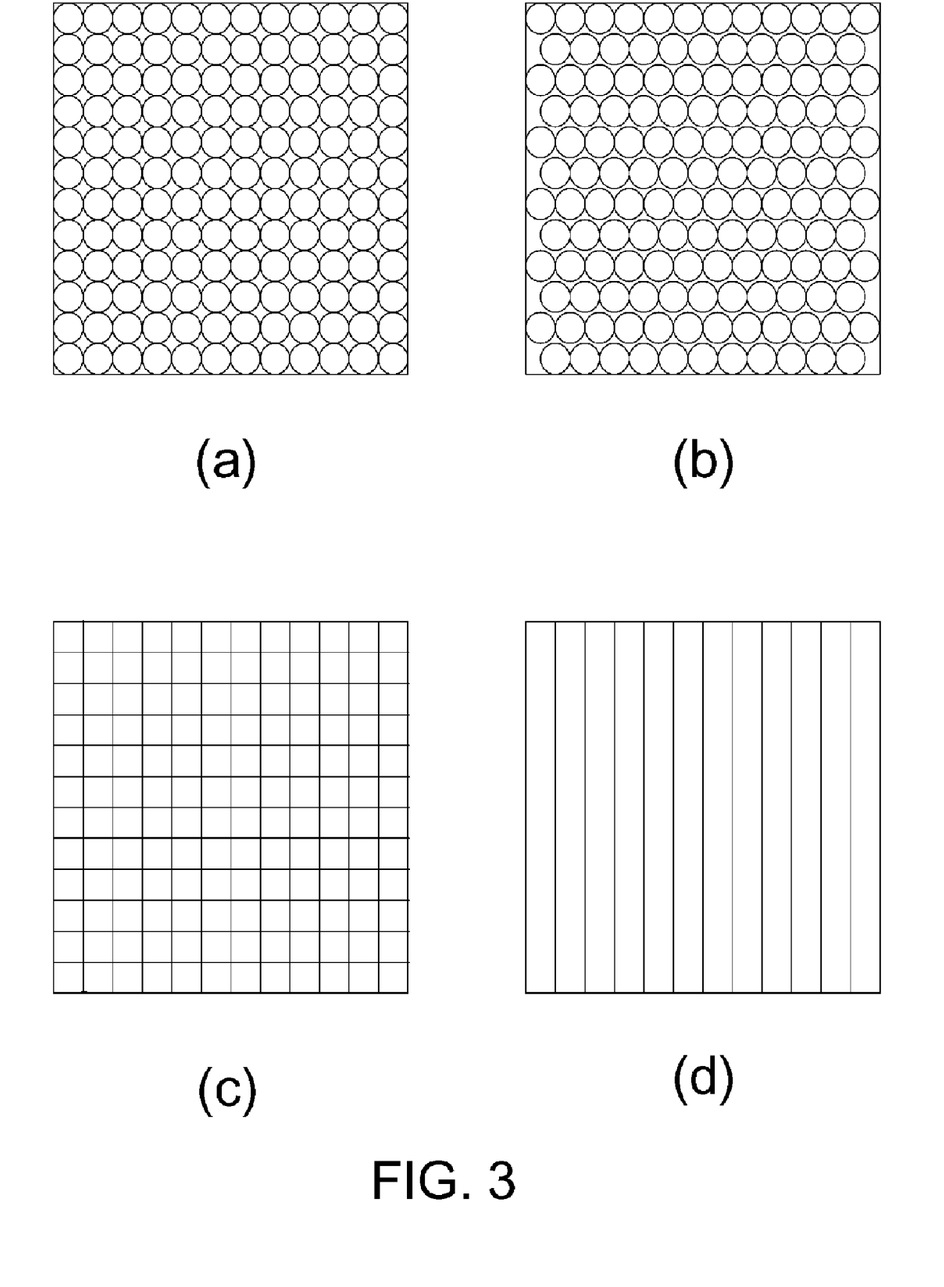
FIG. 3 shows six possible configurations for the elements in a matrix lens array.

FIG. 3 shows various configurations for imaging arrays. FIG. 3(a) shows a rectangular matrix of spherical lenslets. FIG. 3(b) shows a matrix of spherical lenslets that are hexagonally close packed. The imaging arrays shown in FIGS. 3(a) and 3(b) represent the traditional fly's eye lens array. However, the lenslet diameters or apertures may be equal to or smaller than the center distances. FIG. 3(c) shows either a rectangular matrix of spherical lenslets each having a rectangular cut or two arrays of crossed cylindrical lenslets. FIG. 3(d) shows a linear array of cylindrical lenslets. This is the traditional lenticular lens sheet or Bonnet Screen. FIG. 3(e) shows a matrix of spherical lenses cut hexagonally that are hexagonally close packed. Imaging elements may be reflective, refractive, or diffractive. They may be Fresnel Zone lenslets or Gabor Zone lenslets. They may be comprised of a plurality of holographic optical elements, corner cubes, or even pinholes. FIG. 3(f) shows a pinhole array arranged hexagonally close packed.

Figure 4:
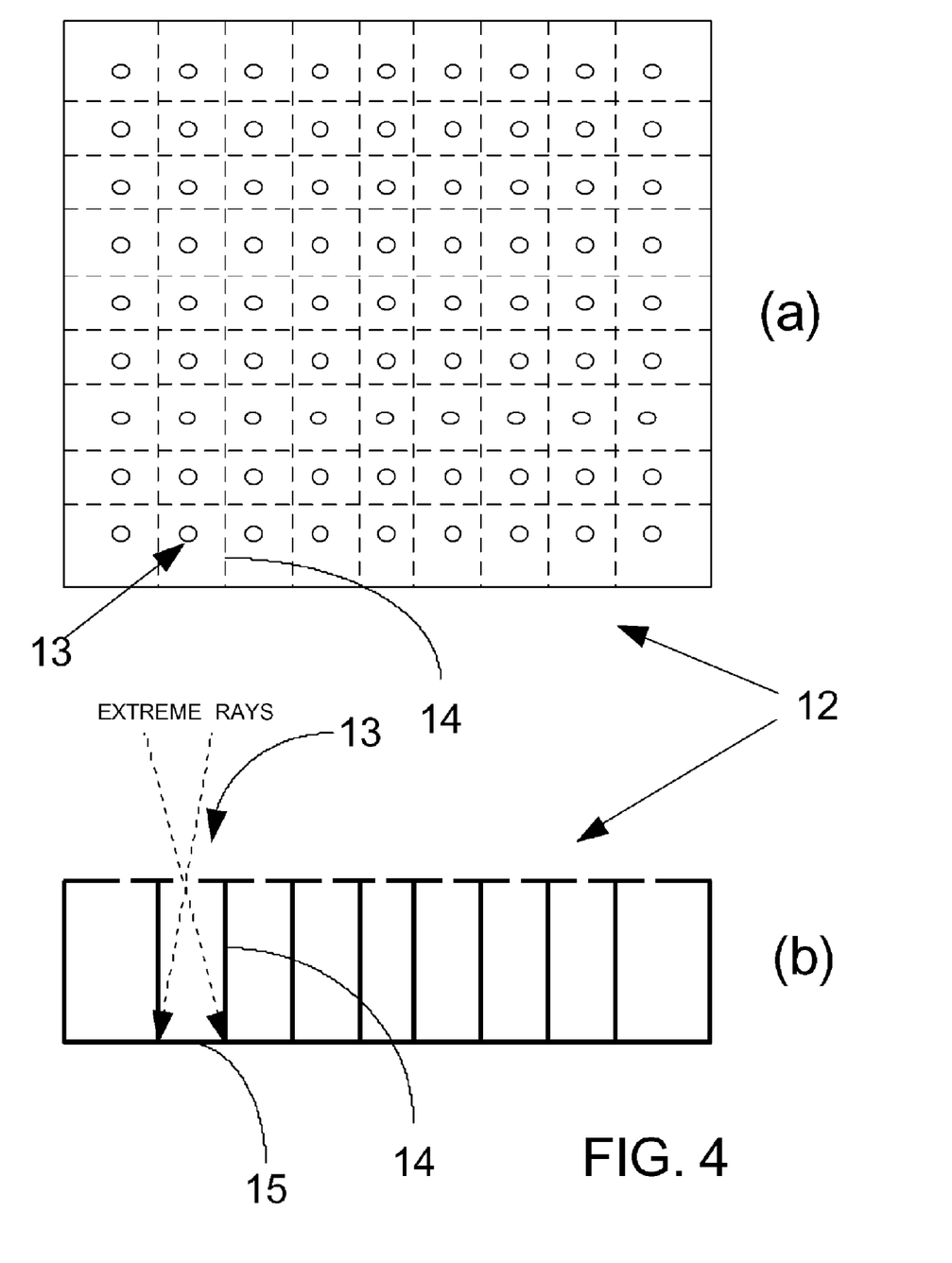
FIG. 4 is an illustration of a baffled pinhole array.

An imaging array of pinholes clearly comprises a plurality of imaging elements wherein adjacent elements do not touch each other. There can be a relatively large number of pinholes that are close together, but they cannot touch. Furthermore, care must be taken that the rays that form a single elemental image come only from a single pinhole. Those portions of the elemental images of an integral frame having overlapping images from multiple pinholes cannot be used to reconstruct the three-dimensional image. Therefore, elemental images must be protected from exposure to rays from adjacent pinholes by a baffling system. This is shown in FIG. 4. FIG. 4(a) is a top plan view of a baffled pinhole array, while FIG. 4(b) is a front elevational view of the same array. The baffle is an array of square holes having the same separation characteristic as the pinhole array. Array 12 is a rectangular matrix of pinholes 13 that create elemental images 15 on an arbitrary image plane. The square baffle 14 protects each elemental image from rays coming from an adjacent pinhole. All rays included between the extreme rays shown in the figure will form the elemental image. All other rays will impinge upon the essentially non-reflecting baffle walls. In effect, each square baffle with its associated pinhole and image plane forms a separate pinhole camera. The pinhole array may be considered to be an array of separate pinhole cameras. The advantage of using such a pinhole array is the picture clarity that results from the infinite depth of focus. The disadvantage lies in the loss of light resulting from the use of pinholes. This can be overcome by using a larger number of pinholes and shortening the distance between the pinholes and the image plane. A pinhole array does not have a focal characteristic. An equivalent to the focal characteristic is the distances from the pinholes to the image plane. This is the imaging distance. The scaling-up process for pinhole arrays requires multiplying these distances by the magnification factor. This holds true because:

$$M = (f'/f) = (s'/s)$$

Therefore, a scaled-up lenslet imaging array may be used to reconstruct a uniformly magnified three-dimensional image of a three-dimensional scene where the initial integral frame was created using a pinhole array. In this case, the separation characteristics and the imaging distances must be scaled-up by the magnification factor.

Figure 5:
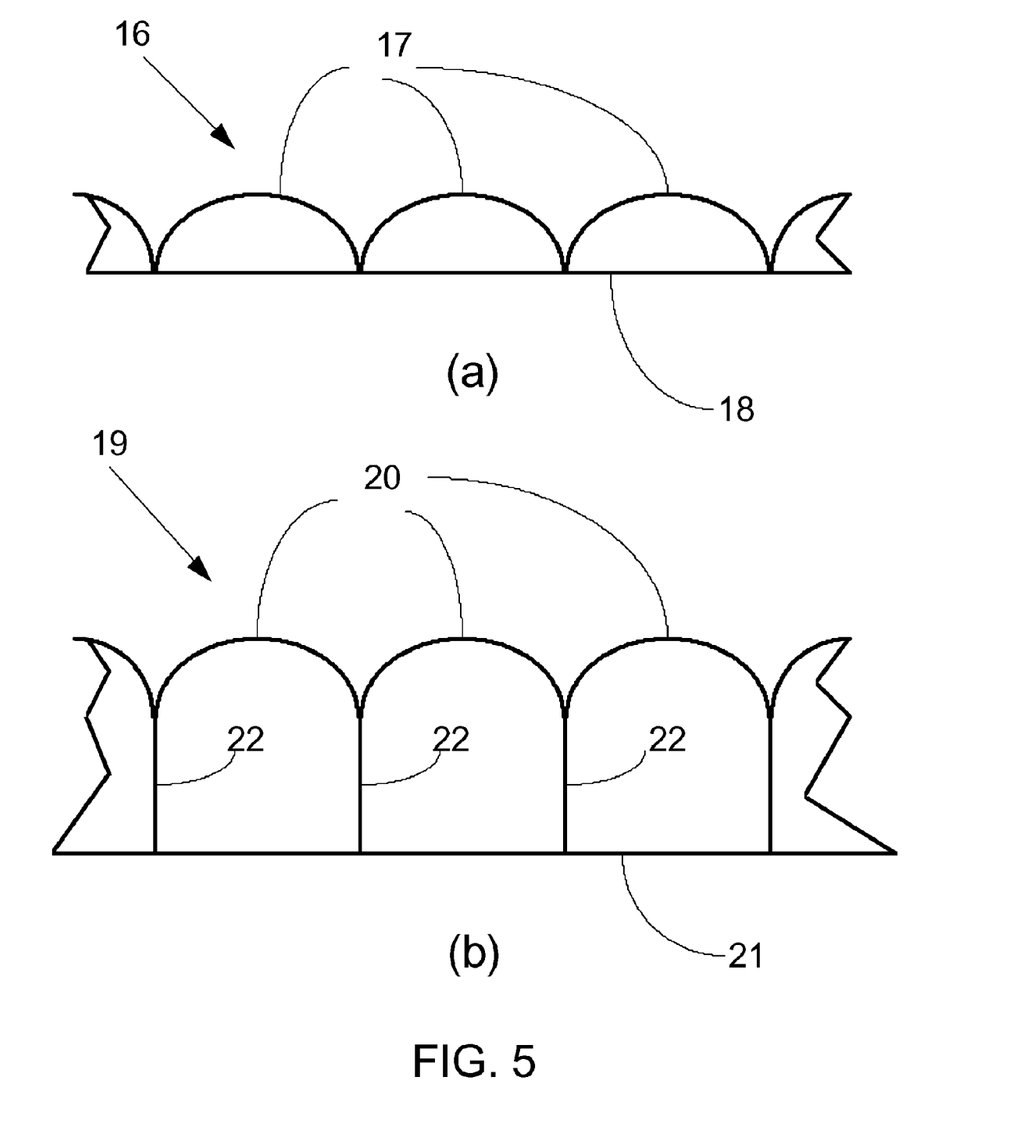
FIG. 5 is shows two illustrations of partial cross sections of imaging arrays in contact with their respective image planes.

In the case of lenslet imaging arrays, the question arises as to how to prevent rays from adjacent lenslets from corrupting an elemental image. In practice, however, this is not a problem. Firstly, the lenslets are very small and they approximate pinholes. Secondly, the lenslet imaging array (and, consequently, the lenslets) is usually in contact with the image plane. In the case of refractive optics, total internal reflection normally prevents rays from traveling to adjacent elemental images. Finally, the edges of a lens cannot redirect rays to form an image. The geometry is shown in FIG. 5. FIG. 5(a) shows a cross section of a spherical or cylindrical lenslet sheet 16 in contact with image plane 18. Only three lenslets 17 are shown. FIG. 5(b) shows a cross section of an imaging array 19 where the curved lenslet surfaces are somewhat further away from image plane 21 than is shown in FIG. 5(a). This array is comprised of separate imaging elements (or lenslets) 20. A natural light barrier between the lenslets exists whereby light is prevented from leaving the imaging element by total internal reflection.

Figure 6:
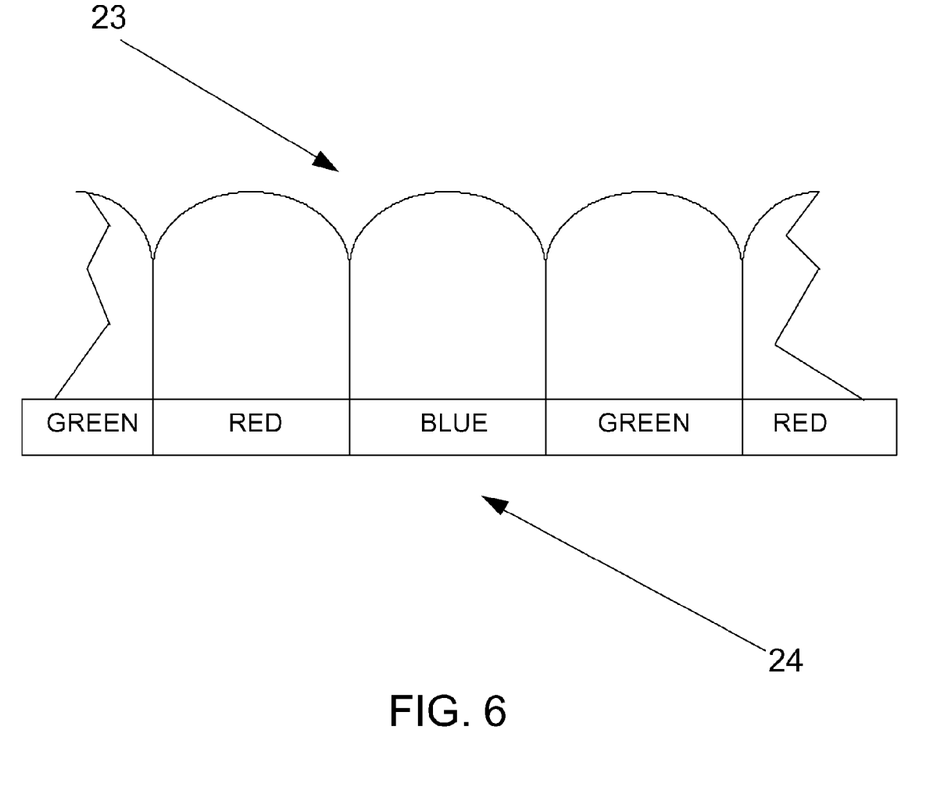
FIG. 6 is an illustration of the partial cross section of an imaging array that uses a color filter.

The Claimed Priority Patents and Applications disclose a method for decreasing the resolution requirements for an integral frame. Where color reconstruction of the three-dimensional image is required, the first integral frame is created in monochrome or black-and-white using a first color filter associated with the first imaging array. Each imaging element has associated with it a different color from a repeating series of primary colors that produce white light. An example of this is shown in FIG. 6. Shown is an imaging array 23 associated with a color filter 24. The color filter is comprised of a repeating series of red, green, and blue elemental filters. When color filters of this type are used, the scaling-up process requires that the first color filter also be uniformly enlarged by the magnification factor to produce a second color filter. Were this second color filter to be appropriately associated with the second imaging array, the reconstructed three-dimensional image will appear in color. This effect would be particularly pleasing where a viewer is located at a sufficient distance so that the individual lenslets cannot be seen (i.e., at minimum visual acuity).

Finally, the subject of eversion must be discussed. Using the scaling-up process of the Present Invention disclosed thus far, the reconstructed three-dimensional image will appear pseudoscopic. Pseudoscopic reconstructions are undesirable, and viewers will demand orthoscopic reconstructions. Therefore, the scaling-up process should further comprise an eversion component wherein an orthoscopic reconstruction is produced.

Figure 7:
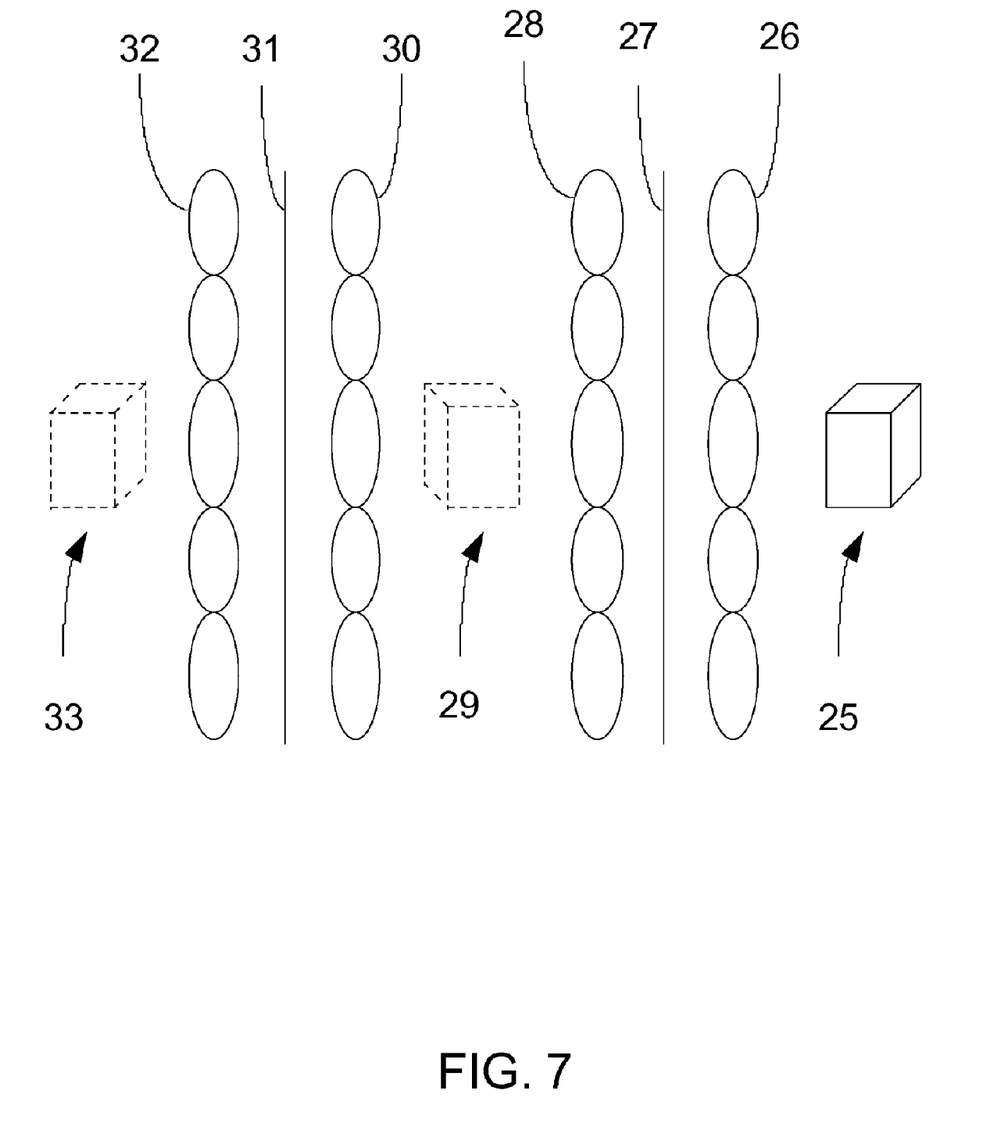
FIG. 7 shows one possible method for producing a reconstructed orthoscopic image of an object or scene from a reconstructed pseudoscopic image of that object or scene.

There are two basic methods that can produce orthoscopic reconstructions. The first method is shown in FIG. 7. This process reconstructs an orthoscopic image 33 from object or scene 25. In the figure, four imaging arrays are used, viz., 26, 28, 30, and 32. To combine magnification with eversion, for example, arrays 30 and 32 can be scaled-up by the magnification factor from arrays 26 and 28 respectively. In that case, enlarging optics would be required. However, in the figure, to avoid confusion, only 1:1 magnification is shown. Referring to the figure, integral frame 27 is created from object or scene 25 using imaging array 26. A pseudoscopic three-dimensional image 29 is reconstructed from integral frame 27 using imaging array 28. A second integral frame 31 is created from the pseudoscopic image 29 using imaging array 30. Upon reconstruction using imaging array 32, image 33 is orthoscopic.

Of course, the integral frame can be pre-processed (as an integral photograph, drawing, printout, or electronic image) so that after enlargement, eversion would be unnecessary. Scaling-up such an integral frame would naturally reconstruct a uniformly magnified orthoscopic image without eversion.

Figure 8:
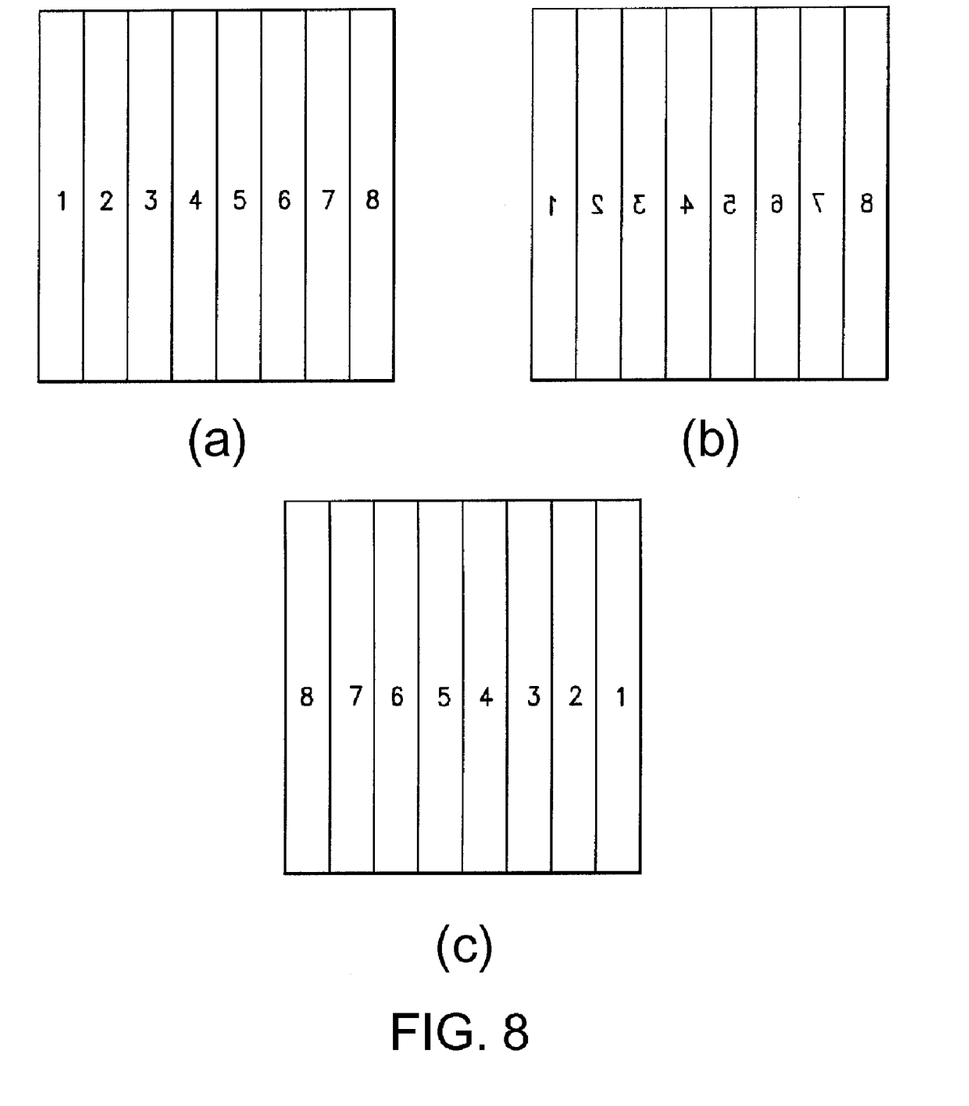
FIG. 8 shows one possible method for manipulating the elemental images of an integral frame so that the reconstructed image would be orthoscopic instead of pseudoscopic.

The second method of eversion is shown in FIG. 8. This is a pre-processing step to produce the integral frame that does not require further eversion. The figure shows a possible method for manipulating the elemental images of an integral frame so that the reconstructed image would be orthoscopic instead of pseudoscopic. This method was described in the Claimed Priority Patents and Applications. In this case, the integral frame is comprised of a linear array of elemental images such that the reconstructed three-dimensional image exhibits only horizontal parallax but no vertical parallax. This type of integral frame would be reconstructed by a Bonnet Screen. FIG. 8(a) shows an original integral frame comprised of eight elemental images. Each of the elemental images, 1–8, represents a separate view of a three-dimensional scene from a different viewpoint along a horizontal axis. The integral frame shown in FIG. 8(a) will reconstruct a pseudoscopic three-dimensional image of the scene with horizontal parallax only. However, the integral frame of FIG. 8(c) is needed in order to reconstruct an orthoscopic three-dimensional image of the scene with the same parallax. The integral frame in FIG. 8(c) differs from that of FIG. 8(a) in that the order of the elemental images is left-right reversed. However, the elemental images themselves are not left-right reversed. FIG. 8(b) shows an integral frame that may be used as an intermediate to produce the integral frame of FIG. 8(c) from that of FIG. 8(a). To produce the integral frame of FIG. 8(b) from that of FIG. 8(a), the elemental images themselves are left-right reversed, but the order of elemental images in both integral frames remains the same. The left-most elemental image in FIG. 8(a) remains as the left-most elemental image in FIG. 8(b); and the right-most elemental image in FIG. 8(a) remains as the right-most elemental image in FIG. 8(b). Then, to produce the integral frame of FIG. 8(c), one need merely left-right reverse the entire integral frame of FIG. 8(b). This is a simpler process than direct production of the integral frame of FIG. 8(c) from that of FIG. 8(a). Once one understands this principle for production of orthoscopic images, the optics to produce the integral frame of FIG. 8(c) would be known to one of ordinary skill.

What is claimed is:

1. A system that produces a uniformly magnified three-dimensional image of a three-dimensional scene comprising:
    a) a first imaging array comprising a plurality of imaging elements arranged linearly or as a matrix, said array having a first separation characteristic and a first focal characteristic;
    b) a first two-dimensional integral frame representative of the three-dimensional scene and comprised of a plurality of two-dimensional elemental images equal in number to and geometrically similar in arrangement as in the first imaging array,
        i) said first integral frame having an initial separation characteristic and
        ii) wherein said first integral frame is created by imaging the three-dimensional scene through the first imaging array;
    c) a projection element that uniformly enlarges by a magnification factor the first integral frame to form an enlarged two-dimensional second integral frame,
        i) said second integral frame having an enlarged separation characteristic and
        ii) wherein the ratio of the enlarged separation characteristic to the initial separation characteristic is equal to the magnification factor;
    d) a second imaging array comprising a plurality of imaging elements equal in number to and geometrically similar in arrangement as in the first imaging array,
        i) said array having a second separation characteristic and a second focal characteristic,
        ii) wherein each imaging element of the second array is arranged in fixed alignment with each elemental image of the second integral frame,
        iii) wherein the ratio of the second separation characteristic to the first separation characteristic is equal to the magnification factor, and
        iv) wherein the ratio of the second focal characteristic to the first focal characteristic is also equal to the magnification factor.

2. The system of claim 1 further comprising elements that evert a pseudoscopic three-dimensional image to form an orthoscopic three-dimensional image.

3. The system of claim 1 wherein the first integral frame is created such that an orthoscopic three-dimensional image is produced without eversion.

4. The system of claim 1 wherein both integral frames are photographs such that the second integral frame is produced as an enlargement of the first integral frame magnified equally in both dimensions by the selected magnification factor.

5. The system of claim 1 wherein only the first integral frame is a photograph.

6. The system of claim 1 wherein the first imaging array is a lens of a camera that produces the first integral frame, and the second imaging array is a screen that reconstructs the three-dimensional image.

7. The system of claim 1 wherein enlargement projection is accomplished optically or electromagnetically.

8. The system of claim 1 wherein enlargement projection is analog or digital.

9. The system of claim 1 wherein enlargement projection is accomplished by scanning.

10. The system of claim 1 wherein either or both imaging arrays comprise imaging elements taken from the group consisting of:
    a) an array of refractive lenses,
    b) an array of reflective lenses,
    c) an array of diffractive lenses,
    d) an array of holographic optical elements,
    e) an array of corner cubes, and
    f) an array of pinholes.

11. The system of claim 10 wherein the diffractive lenses are Fresnel Zone Plates or Gabor Zone Plates.

12. The system of claim 4 further comprising color filters to produce the first integral frame as a monochrome or black-and-white photograph and corresponding color filters to reconstruct the three-dimensional image in color.

13. The system of claim 5 further comprising color filters to produce the first integral frame as a monochrome or black-and-white photograph and corresponding color filters to reconstruct the three-dimensional image in color.

14. The system of claim 1 wherein the magnified three-dimensional image exhibits only horizontal parallax and no vertical parallax.

15. A system that produces a uniformly magnified three-dimensional image of a three-dimensional scene from a two-dimensional integral frame representing that scene comprising:
    a) a first two-dimensional integral frame representative of the three-dimensional scene and comprised of a plurality of two-dimensional elemental images equal in number to and geometrically similar in arrangement as in the first imaging array, wherein said first integral frame has an image characteristic and an initial separation characteristic that uniquely defines a real or virtual imaging array that made or would have made the first integral frame;
    b) a projection element that uniformly enlarges by a magnification factor the first integral frame to form an enlarged two-dimensional second integral frame,
        i) said second integral frame having an enlarged separation characteristic and
        ii) wherein the ratio of the enlarged separation characteristic to the initial separation characteristic is equal to the magnification factor; and
    c) a imaging array comprising a plurality of imaging elements equal in number to and geometrically similar in arrangement as in the first imaging array, wherein:
        i) said imaging array has an enlarged separation characteristic and an enlarged focal characteristic,
        ii) wherein each imaging element of the imaging array is arranged in fixed alignment with each elemental image of the second integral frame,
        iii) wherein the ratio of the enlarged separation characteristic to the initial separation characteristic is equal to the magnification factor, and
        iv) wherein the ratio of the enlarged focal characteristic to the image characteristic is also equal to the magnification factor.

16. The system of claim 15 further comprising elements that evert a pseudoscopic three-dimensional image to form an orthoscopic three-dimensional image.

17. The system of claim 15 wherein the first integral frame is created such that an orthoscopic three-dimensional image is produced without eversion.

18. The system of claim 15 wherein each elemental image of the first integral frame is a photograph, a drawing, a computer printout, or an electronic image.

19. The system of claim 15 wherein the imaging array is a screen that reconstructs the three-dimensional image.

20. The system of claim 15 wherein enlargement projection is accomplished optically or electromagnetically.

21. The system of claim 15 wherein enlargement projection is analog or digital.

22. The system of claim 15 wherein enlargement projection is accomplished by scanning.

23. The system of claim 15 wherein the imaging array comprises imaging elements taken from the group consisting of:
   a) an array of refractive lenses,
   b) an array of reflective lenses,
   c) an array of diffractive lenses,
   d) an array of holographic optical elements,
   e) an array of corner cubes, and
   f) an array of pinholes.

24. The system of claim 23 wherein the diffractive lenses are Fresnel Zone Plates or Gabor Zone Plates.

25. The system of claim 15 wherein the first integral frame comprises only monochrome or black-and-white elemental images.

26. The system of claim 15 further comprising color filters to reconstruct the three-dimensional image in color.

27. The system of claim 15 wherein the magnified three-dimensional image exhibits only horizontal parallax and no vertical parallax.

28. A method for producing a uniformly magnified three-dimensional image of a three-dimensional scene comprising:
   a) creating a first two-dimensional integral frame that represents the three-dimensional scene and is comprised of a plurality of two-dimensional elemental images, wherein
      i) said first integral frame has an initial separation characteristic and an initial image characteristic that uniquely defines a real or virtual imaging array that made or would have made the first integral frame, and
      ii) the elemental images are two-dimensional projections of the three-dimensional scene from different viewpoints, the projections having been made by said real imaging array or being identical to those that would have been made by said virtual imaging array;
   b) uniformly enlarging by a magnification factor the first integral frame to form an enlarged two-dimensional second integral frame, wherein
      i) said second integral frame has an enlarged separation characteristic and
      ii) the ratio of the enlarged separation characteristic to the initial separation characteristic is equal to the magnification factor; and,
   c) reconstructing the magnified three-dimensional image using an output imaging array comprising a plurality of imaging elements equal in number to and geometrically similar in arrangement as the image elements of the enlarged integral frame, wherein:
      i) said output imaging array has an enlarged separation characteristic and an enlarged focal characteristic,
      ii) each imaging element of the output imaging array is arranged in fixed alignment with each elemental image of the enlarged integral frame,
      iii) the ratio of the enlarged separation characteristic to the initial separation characteristic is equal to the magnification factor, and
      iv) wherein the ratio of the enlarged focal characteristic to the initial image characteristic is also equal to the magnification factor.

29. The method of claim 28 further comprising everting the three-dimensional image from pseudoscopy to orthoscopy.

30. The method of claim 28 further comprising creating the first integral frame such that an orthoscopic three-dimensional image is produced without eversion.

31. The method of claim 28 further comprising using color filters to reconstruct the three-dimensional image in color where the first integral frame is monochrome or black-and-white.

32. The system of claim 28 further comprising eliminating vertical parallax from the magnified three-dimensional image so that it exhibits only horizontal parallax.

33. A method for producing a uniformly magnified three-dimensional image of a three-dimensional scene comprising:
   a) creating a two-dimensional integral frame that represents the three-dimensional scene magnified and is comprised of a plurality of two-dimensional elemental images, wherein
      i) said integral frame has an integral frame separation characteristic and an integral frame image characteristic that uniquely defines a virtual imaging array that would have made the integral frame, and
      ii) the elemental images are two-dimensional projections of the magnified three-dimensional scene from different viewpoints, the projections being identical to those that would have been made by the virtual imaging array; and,
   b) reconstructing the magnified three-dimensional image using a real output imaging array comprising a plurality of imaging elements, the output array being identical to the virtual imaging array.

34. The method of claim 33 further comprising everting the three-dimensional image from pseudoscopy to orthoscopy.

35. The method of claim 33 further comprising creating the integral frame such that an orthoscopic three-dimensional image is produced without eversion.

36. The method of claim 33 further comprising using color filters to reconstruct the three-dimensional image in color where the integral frame is monochrome or black-and-white.

37. The system of claim 33 further comprising eliminating vertical parallax from the magnified three-dimensional image so that it exhibits only horizontal parallax.

* * * * *